(12) United States Patent
Hsu et al.

(10) Patent No.: US 11,671,860 B2
(45) Date of Patent: Jun. 6, 2023

(54) METHOD AND APPARATUS FOR COLLECTING LATENCY INFORMATION AND GENERATING UPLINK LATENCY INDICATORS ON ACCESS POINT SIDE

(71) Applicant: MEDIATEK INC., Hsin-Chu (TW)

(72) Inventors: Chien-Fang Hsu, Hsinchu (TW); James Chih-Shi Yee, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 25 days.

(21) Appl. No.: 17/341,396

(22) Filed: Jun. 8, 2021

(65) Prior Publication Data

US 2021/0391933 A1     Dec. 16, 2021

Related U.S. Application Data

(60) Provisional application No. 63/038,942, filed on Jun. 15, 2020.

(51) Int. Cl.

| | |
|---|---|
| *H04B 17/26* | (2015.01) |
| *H04B 17/364* | (2015.01) |
| *H04L 43/067* | (2022.01) |
| *H04L 43/0852* | (2022.01) |
| *H04W 24/08* | (2009.01) |
| *H04W 24/10* | (2009.01) |
| *H04W 28/02* | (2009.01) |
| *H04W 48/06* | (2009.01) |
| *H04W 48/16* | (2009.01) |
| *H04W 84/12* | (2009.01) |
| *H04W 88/02* | (2009.01) |

(Continued)

(52) U.S. Cl.
CPC ............ *H04W 24/10* (2013.01); *H04B 17/26* (2015.01); *H04B 17/364* (2015.01); *H04L 43/067* (2013.01); *H04L 43/0852* (2013.01); *H04W 24/08* (2013.01); *H04W 28/0236* (2013.01); *H04W 28/0278* (2013.01); *H04W 48/06* (2013.01); *H04W 48/16* (2013.01); *H04W 84/12* (2013.01); *H04W 88/02* (2013.01); *H04W 88/08* (2013.01); *H04W 92/02* (2013.01); *H04W 92/10* (2013.01)

(58) Field of Classification Search
CPC ........... H04B 17/0082–3913; H04L 43/02–55; H04W 8/22–245; H04W 24/02–10; H04W 28/02–26; H04W 36/0005–385; H04W 48/02–20; H04W 60/005–06; H04W 72/005–14; H04W 74/002–0891; H04W 84/02–16; H04W 88/005–12; H04W 92/02; H04W 92/04; H04W 92/10
See application file for complete search history.

(56) References Cited

U.S. PATENT DOCUMENTS

2008/0253314 A1* 10/2008 Stephenson ........... H04W 24/08
2017/0273100 A1* 9/2017 Huang .................. H04W 74/08

FOREIGN PATENT DOCUMENTS

WO    WO-2020251197 A1 * 12/2020 .......... H04W 74/008

\* cited by examiner

*Primary Examiner* — Timothy J Weidner
(74) *Attorney, Agent, or Firm* — Winston Hsu (57) ABSTRACT

An uplink (UL) latency indication method includes: collecting, by an access point (AP), latency information associated with communications with at least one non-AP station (STA), without asking latency measurement on said at least one non-AP STA; and performing statistical analysis on the latency information to generate at least one UL latency indicator.

17 Claims, 7 Drawing Sheets

(51) Int. Cl.
*H04W 88/08* (2009.01)
*H04W 92/02* (2009.01)
*H04W 92/10* (2009.01)

METHOD AND APPARATUS FOR COLLECTING LATENCY INFORMATION AND GENERATING UPLINK LATENCY INDICATORS ON ACCESS POINT SIDE

CROSS REFERENCE TO RELATED APPLICATIONS

This application claims the benefit of U.S. provisional application No. 63/038,942, filed on Jun. 15, 2020 and incorporated herein by reference.

BACKGROUND

The present invention relates to wireless communications, and more particularly, to a method and apparatus of collecting latency information and generating uplink latency indicators on an access point side.

In a wireless fidelity (WiFi) communication system, an access point (AP) can provide various statistics of downlink (DL) delay, such as transmit delay, queue delay, and channel access delay. The DL latency statistics can be provided to non-AP stations (STAs), such that each non-AP STA can use such DL latency information to select a basic service set (BSS) or a link to associate. Those latency statistics obtained at the AP side focus on DL traffic only. The typical AP side has difficulty in knowing the uplink (UL) latency due to the fact that most information is available on the non-AP STA side. Thus, there is a need for an innovative design which enables the AP side to provide UL latency indicators without asking latency measurement on the non-AP STA side.

SUMMARY

One of the objectives of the claimed invention is to provide a method and apparatus of collecting latency information and generating uplink latency indicators on an access point side.

According to a first aspect of the present invention, an exemplary uplink (UL) latency indication method is disclosed. The exemplary UL latency indication method includes: collecting, by an access point (AP), latency information associated with communications with at least one non-AP station (STA), without asking latency measurement on said at least one non-AP STA; and performing statistical analysis on the latency information to generate at least one UL latency indicator.

According to a second aspect of the present invention, an exemplary access point (AP) is disclosed. The exemplary AP includes a data collecting circuit and a data processing circuit. The data collecting circuit is arranged to collect latency information associated with communications with at least one non-AP station (STA), without asking latency measurement on said at least one non-AP STA. The data processing circuit is arranged to perform statistical analysis on the latency information to generate at least one uplink (UL) latency indicator.

According to a third aspect of the present invention, an exemplary uplink (UL) latency indication method is disclosed. The exemplary UL latency indication method includes: collecting, by an access point (AP), latency information associated with communications with at least one non-AP station (STA), wherein the latency information is not provided by said at least one non-AP STA; and performing statistical analysis on the latency information to generate at least one UL latency indicator.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
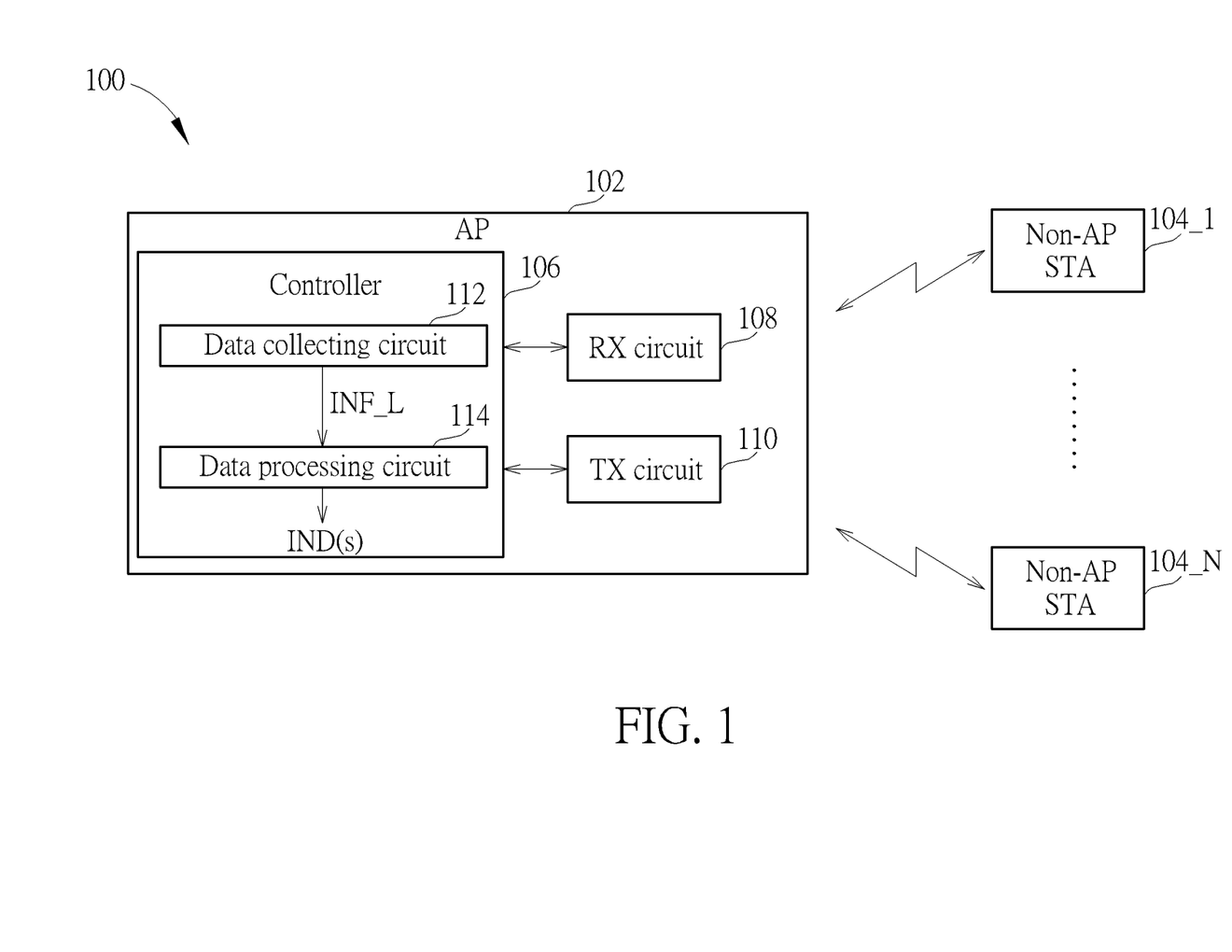
FIG. 1 is a diagram illustrating a wireless fidelity (WiFi) communication system according to an embodiment of the present invention.

FIG. 1 is a diagram illustrating a wireless fidelity (WiFi) communication system according to an embodiment of the present invention. The WiFi communication system 100 has a plurality of wireless communication devices, including an access point (AP) 102 and one or more non-AP stations (STAs) 104_1-104_N (N≥1). For example, AP 102 and non-AP STAs 104_1-104_N may be in compliance with IEEE 802.11ax and IEEE 802.11 be standard. In this embodiment, AP 102 includes a controller 106, a receiver (RX) circuit 108, and a transmitter (TX) circuit 110, where the controller 106 is coupled to RX circuit 108 and TX circuit 110, and includes a data collecting circuit 112 and a data processing circuit 114. It should be noted that only the components pertinent to the present invention are shown in FIG. 1. In practice, AP 102 is allowed to include additional components for achieving other designated functions. AP 102 communicates with non-AP STAs 104_1-104_N via RX circuit 108 and TX circuit 110. For example, the RX circuit 108 can be used to deal with uplink (UL) traffic from any of non-AP STAs 104_1-104_N to AP 102, and the TX circuit 110 can be used to deal with downlink (DL) traffic from AP 102 to any of non-AP STAs 104_1-104_N.

The data collecting circuit 112 is arranged to collect latency information INF_L associated with communications with non-AP STAs 104_1-104_N, without asking latency measurement on non-AP STAs 104_1-104_N. The latency information INF_L is collected by AP 102 locally. In other words, the latency information INF_L is collected by AP 102 on its own, and is not provided by non-AP STAs 104_1-104_N. The data processing circuit 114 is coupled to the data collecting circuit 112, and is arranged to perform statistical analysis on the latency information INF_L to generate one or more UL latency indicators IND(s). The present invention has no limitation on an algorithm for performing statistical analysis on the collected latency information INF_L. For example, statistics of the latency information INF_L may cover average, percentile, histogram, etc. Further details of the proposed AP-side UL latency indication scheme are described with reference to the accompanying drawings.

In a first exemplary UL latency indicator design, each UL latency indicator IND generated from the data processing circuit 114 is a buffer status based UL latency indicator. AP 102 can use trigger frames to trigger UL traffic, and the triggered based (TB) UL transmission becomes more important. A buffer status of a non-AP STA 104_i (1≤i≤N) may be reported in a solicited way or an unsolicited way, and may be carried by using a QoS (Quality of Service) Control field or an HT (High Throughput) Control field. For example, a media access control (MAC) header of a MAC frame includes a QoS Control field and an HT Control field, where the QoS Control field is 2 octets in length, and the HT Control field is 4 octets in length. Regarding the 16-bit QoS Control field, bits 0-3 indicate a Traffic Identifier (TID). When bit 4 of the QoS Control field is set by 1, a Queue Size subfield is specified in bits 8-15 of the QoS Control field. The QoS Control field is present in QoS Data and QoS Null frames, and can be used to carry a buffer status of a non-AP STA by using the Queue Size subfield. For example, the Queue Size subfield indicates the amount of buffered traffic for a given traffic category (TC) or traffic stream (TS) at the non-AP STA sending the frame that contains this subfield. To put it another way, the Queue Size subfield (bits 8-15) carries non-AP STA's buffer status for the TID (bits 0-3).

The HT Control field is always present in a Control Wrapper frame, and is present in QoS Data, QoS Null and Management frames. The HT Control field has three variants: the HT variant, the VHT (Very High Throughput) variant, and the HE variant. The variant formats are differentiated by values of first two bits B0 and B1 of the HT Control field. When the first two bits B0 and B1 are 1's, it means that the HT Control field contains the HE variant. The HE variant of the HT Control field has an A-Control subfield set by bits B2-B31 of the HT Control field. The A-Control subfield of the HE variant is 30 bits in length, where a control identifier (ID) subfield (4 bits) of the A-Control subfield can be set by a designated value (e.g., control ID=3) to indicate that a buffer status report (BSR) is carried by a control information subfield (26 bits) of the A-Control subfield.

The non-AP STA 104_i (1≤i≤N) can report its buffer status in a solicited way. For example, upon receiving a buffer status report polling (BSRP) frame from the AP 102, the non-AP STA 104_i (1≤i≤N) can use A-Control BSR in HT Control field or Queue Size (QS) in QoS Control field to respond to the BSRP frame. Furthermore, the non-AP STA 104_i (1≤i≤N) is allowed to report its buffer status in an unsolicited way. For example, the non-AP STA 104_i (1≤i≤N) can use A-Control BSR in HT Control field or QS in QoS Control field to proactively report its buffer status at the absence of BSRP from AP 102.

Figure 2:
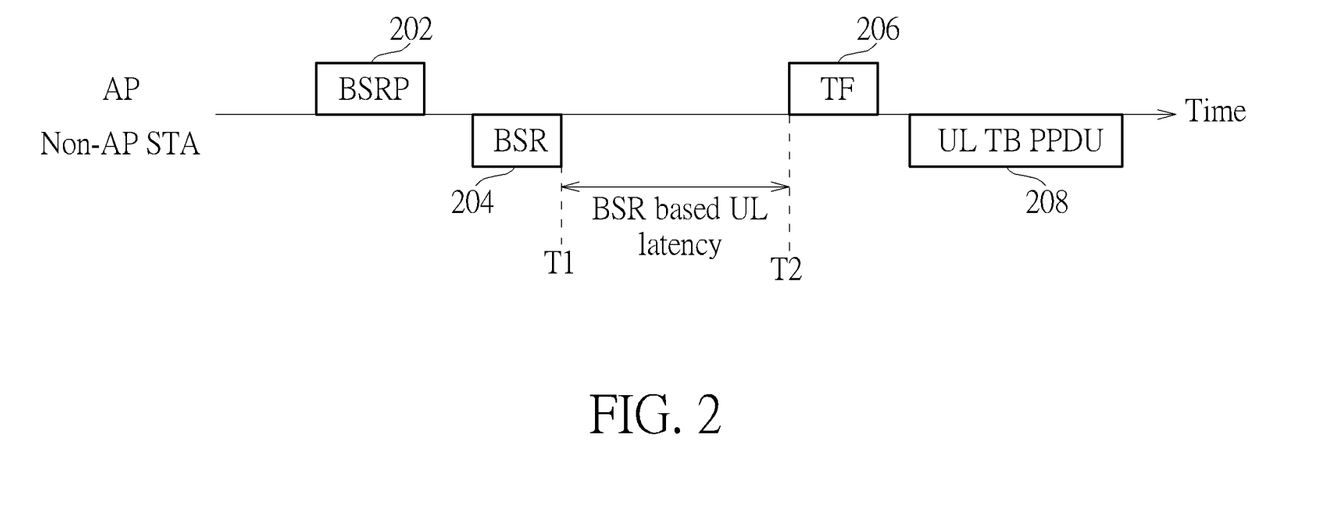
FIG. 2 is a diagram illustrating a first AP-side UL latency information collection design according to an embodiment of the present invention.

FIG. 2 is a diagram illustrating a first AP-side UL latency information collection design according to an embodiment of the present invention. In this embodiment, TX circuit 110 of AP 102 may send a BSRP frame 202 to a non-AP STA 104_i (1≤i≤N), RX circuit 108 of AP 102 may receive a BSR (which is a solicited BSR) 204 from the non-AP STA 104_i, and then TX circuit 110 of AP 102 may send a trigger frame (TF) 206 to the non-AP STA 104_i to trigger transmission of uplink trigger-based physical layer protocol data unit (UL TB PPDU) 208. Specifically, BSRP/BSR provides a protocol for AP 102 to acquire the buffer status of each access category (AC) on non-AP STA 104_i, so that AP 102 can send the trigger frame to trigger UL traffic from non-AP STA 104_i. The latency from arrival of solicited BSR 204 to response of trigger frame 206 may be regarded as UL latency. The latency information INF_L collected by the data collecting circuit 112 may include a time delay between a time instant T1 at which the AP 102 receives the BSR (which is a solicited BSR) 204 and a time instant T2 at which the AP 102 sends the trigger frame 206 to trigger UL traffic from non-AP STA 104_i in response to the BSR (which is a solicited BSR) 204.

Figure 3:
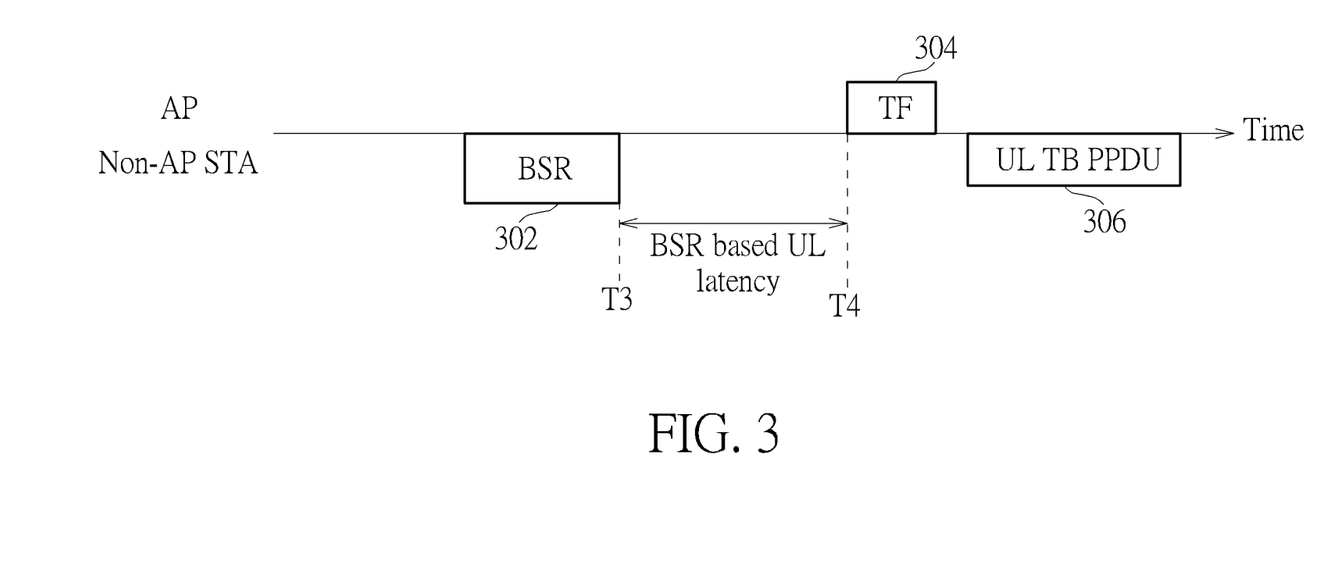
FIG. 3 is a diagram illustrating a second AP-side UL latency information collection design according to an embodiment of the present invention.

FIG. 3 is a diagram illustrating a second AP-side UL latency information collection design according to an embodiment of the present invention. In this embodiment, a non-AP STA 104_i (1≤i≤N) can use an unsolicited BSR to report its buffer status of each AC to AP 102. As shown in FIG. 3, RX circuit 108 of AP 102 receives a BSR (which is an unsolicited BSR) 302 from non-AP STA 104_i (1≤i≤N), and then TX circuit 110 of AP 102 may send a trigger frame (TF) 304 to the non-AP STA 104_i to trigger transmission of UL TB PPDU 306. The latency from arrival of unsolicited BSR 302 to response of trigger frame 304 may be regarded as UL latency. The latency information INF_L collected by the data collecting circuit 112 may include a time delay between a time instant T3 at which the AP 102 receives the BSR (which is an unsolicited BSR) 302 and a time instant T4 at which the AP 102 sends the trigger frame 304 to trigger UL traffic from non-AP STA 104_i in response to the BSR (which is an unsolicited BSR) 302.

The latency information INF_L is collected by AP 102 on its own, and records a plurality of time delays, each representative of BSR based UL latency between AP 102 and one of non-AP STAs 104_1-104_N. As mentioned above, the data processing circuit 114 performs statistical analysis on the latency information INF_L to generate one or more UL latency indicators IND(s). In some embodiments of the present invention, the data processing circuit 114 may generate one UL latency indicator IND per access category (AC).

A BSR can be solicited or unsolicited. In some embodiments of the present invention, the data processing circuit 114 may generate one UL latency indicator IND as a solicited BSR based UL latency indicator, and may generate another UL latency indicator IND as an unsolicited BSR based UL latency indicator. Specifically, the data processing circuit 114 generates a first UL latency indicator by performing statistical analysis on time delays, each between a time instant at which the AP 102 receives a solicited BSR and a time instant at which the AP 102 sends a trigger frame to respond to the solicited BSR; and further generates a second UL latency indicator by performing statistical analysis on time delays, each between a time instant at which the AP 102 receives an unsolicited BSR and a time instant at which the AP 102 sends a trigger frame to respond to the unsolicited BSR.

The buffer status can also be reported by using a QoS Control field. The latency information INF_L is collected by AP 102 on its own, and records a plurality of time delays, each representative of QoS based UL latency between AP 102 and one of non-AP STAs 104_1-104_N.

Figure 4:
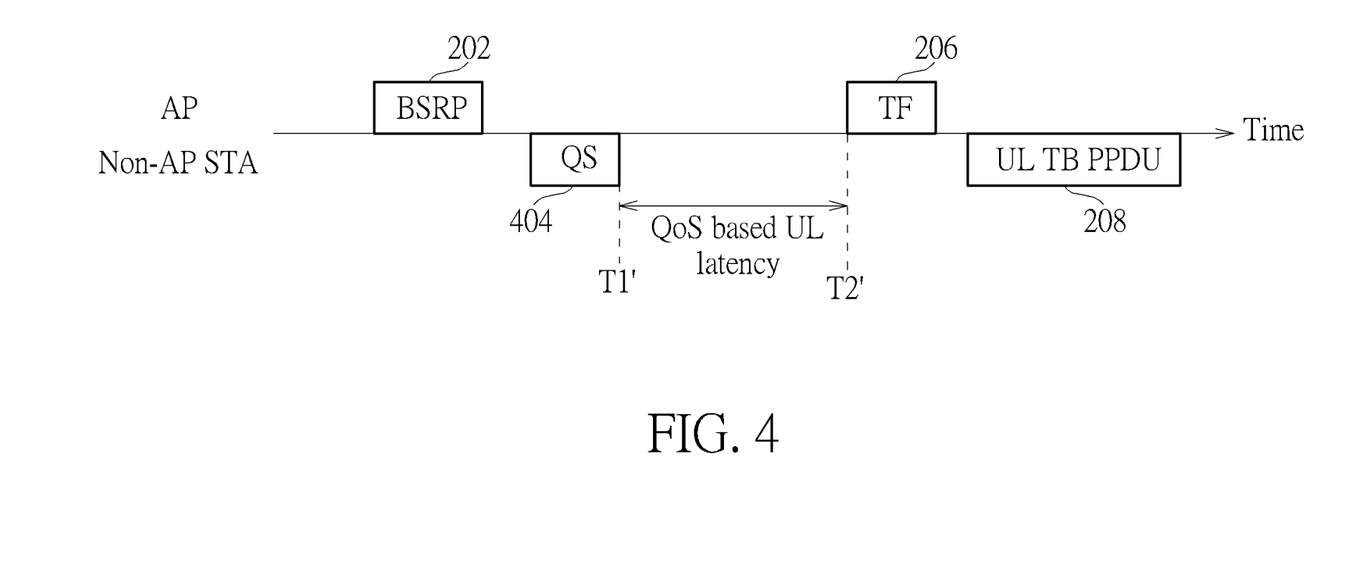
FIG. 4 is a diagram illustrating a third AP-side UL latency information collection design according to an embodiment of the present invention.

FIG. 4 is a diagram illustrating a third AP-side UL latency information collection design according to an embodiment of the present invention. In this embodiment, TX circuit 110 of AP 102 may send the BSRP frame 202 to a non-AP STA 104_i ($1 \leq i \leq N$), RX circuit 108 of AP 102 may receive a QS (which is a solicited QS) 404 from the non-AP STA 104_i, and then TX circuit 110 of AP 102 may send the trigger frame (TF) 206 to the non-AP STA 104_i to trigger transmission of UL TB PPDU 208. The latency from arrival of solicited QS 404 to response of trigger frame 206 may be regarded as UL latency. The latency information INF_L collected by the data collecting circuit 112 may include a time delay between a time instant T1' at which the AP 102 receives the QS (which is a solicited QS) 404 and a time instant T2' at which the AP 102 sends the trigger frame 206 to trigger UL traffic from non-AP STA 104_i in response to the QS (which is a solicited QS) 404.

Figure 5:
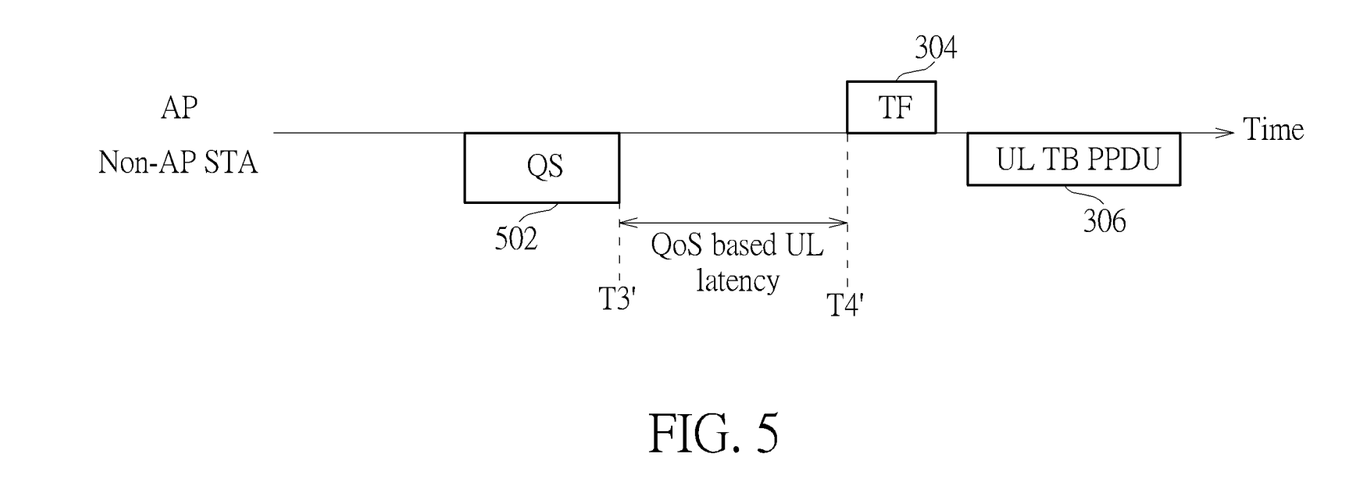
FIG. 5 is a diagram illustrating a fourth AP-side UL latency information collection design according to an embodiment of the present invention.

FIG. 5 is a diagram illustrating a fourth AP-side UL latency information collection design according to an embodiment of the present invention. In this embodiment, a non-AP STA 104_i ($1 \leq i \leq N$) can use an unsolicited QS to report its buffer status to AP 102. As shown in FIG. 5, RX circuit 108 of AP 102 receives a QS (which is an unsolicited QS) 502 from non-AP STA 104_i ($1 \leq i \leq N$), and then TX circuit 110 of AP 102 may send the trigger frame (TF) 304 to the non-AP STA 104_i to trigger transmission of UL TB PPDU 306. The latency from arrival of unsolicited QS 502 to response of trigger frame 304 may be regarded as UL latency. The latency information INF_L collected by the data collecting circuit 112 may include a time delay between a time instant T3' at which the AP 102 receives the QS (which is an unsolicited QS) 502 and a time instant T4' at which the AP 102 sends the trigger frame 304 to trigger UL traffic from non-AP STA 104_i in response to the QS (which is an unsolicited QS) 502.

In a second exemplary UL latency indicator design, each UL latency indicator IND generated from the data processing circuit 114 is a periodic UL traffic latency indicator. The current BSRP/BSR provides a protocol for AP to acquire the buffer status of each access category (AC) on non-AP STA, so that AP can send the trigger frame to trigger UL traffic. However, using BSRP/BSR is unable to meet requirements of latency sensitive traffic applications, such as gaming control and industrial automation. Specifically, for latency sensitive and periodic UL traffic, waiting for AP's BSRP is not sufficient to satisfy jitter requirement and latency is not guaranteed. To address this issue, an aggregated control (A-Control) subfield can be used for traffic indication signaling between AP and non-AP STA. For example, the first two bits B0 and B1 of the HT Control field are 1's, and the HE variant of the HT Control field has an A-Control subfield set by bits B2-B31 of the HT Control field, where a control ID subfield (4 bits) of the A-Control subfield is set by a designated value to indicate that the traffic indication information is carried by a control information subfield (maximum 26 bits) of the A-Control subfield. It should be noted that, the traffic indication information carried by the A-Control subfield is informative only, without being used for doing negotiation with the AP.

In this embodiment, the UL traffic required by a latency sensitive traffic application may be periodic UL traffic, and the traffic indication information may include multiple parameters to describe characteristics of the periodic traffic. For example, the traffic indication information carried by the control information subfield of the A-Control subfield may include a parameter "Period" indicating a period of the periodic traffic, a parameter "Delta Period" indicating a delta time from a current frame carrying the A-Control subfield to a time instant the periodic traffic is transmitted by non-AP STA 104_i ($1 \leq i \leq N$), a parameter "Traffic Size" indicating a traffic size of the periodic traffic, etc. Ideally, with the help of traffic indication information carried by A-Control subfield, characteristics of the periodic UL traffic required by the latency sensitive traffic application are known to AP 10, and AP 102 can allocate proper resources in advance and can trigger UL transmission from non-AP STA 104_i in time.

Figure 6:
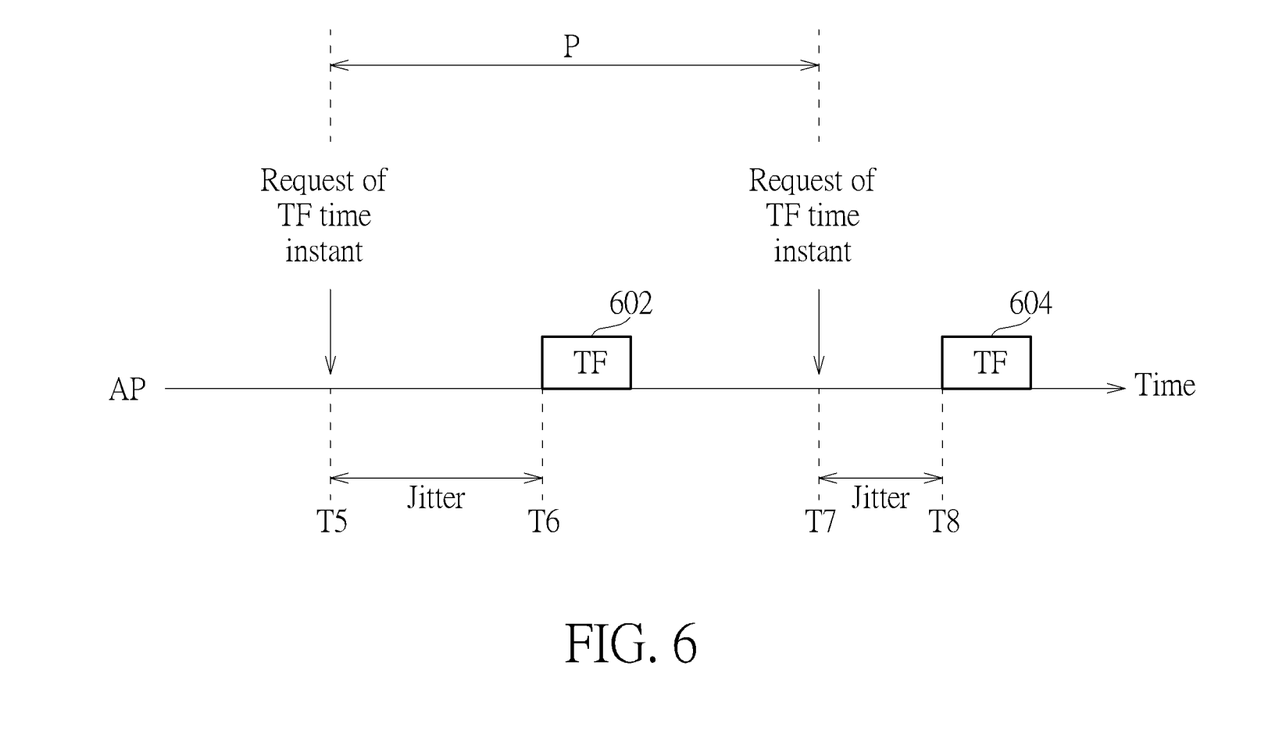
FIG. 6 is a diagram illustrating a fifth AP-side UL latency information collection design according to an embodiment of the present invention.

FIG. 6 is a diagram illustrating a fifth AP-side UL latency information collection design according to an embodiment of the present invention. The RX circuit 108 of AP 102 receives traffic indication information signaled from non-AP STA 104_i ($1 \leq i \leq N$), wherein the traffic indication information is carried by a control information subfield of an A-Control subfield, and contains timing information of UL traffic requested by non-AP STA 104_i. For example, the UL traffic requested by the non-AP STA 104_i may be periodic UL traffic required by a latency sensitive traffic application running on the non-AP STA 104_i, and the timing information of the period UL traffic may include a parameter "Period" indicating a period P of the periodic UL traffic, and a parameter "Delta Period" indicating a delta time from a current frame carrying the A-Control subfield to a time instant the periodic UL traffic is transmitted by non-AP STA 104_i. Hence, AP 102 can refer to the signaled traffic indication information to know that one trigger frame is requested at a time instant T5 for triggering UL traffic from non-AP STA 104_i, and another trigger frame is requested at a time instant T7 for triggering UL traffic from non-AP STA 104_i. However, AP 102 may not be able to trigger non-AP STA 104_i on time due to interference, transmission opportunity (TXOP) occupancy by other non-AP STAs, and/or AP's schedule. Jitter from the requested start time of the trigger frame may serve as an indicator about how AP 102 can serve non-AP STA's requests, and may be regarded as UL latency. In this embodiment, the latency information INF_L collected by the data collecting circuit 112 includes a time delay between the time instant T5 at which the trigger frame 602 is requested by the traffic indication information and a time instant T6 at which the AP 102 actually sends the trigger frame 602 to trigger the UL traffic from non-AP STA 104_i, and a time delay between the time instant T7 at which the trigger frame 604 is requested by the traffic indication information and a time instant T8 at which the AP 102 actually sends the trigger frame 604 to trigger the UL traffic from non-AP STA 104_i. The data processing circuit 114 performs statistical analysis on the latency information INF_L (which includes jitter information) to generate an UL latency indicator IND. In other words, statistics of the jitter provide UL latency information of periodic UL traffic requested by non-AP STAs.

Figure 7:
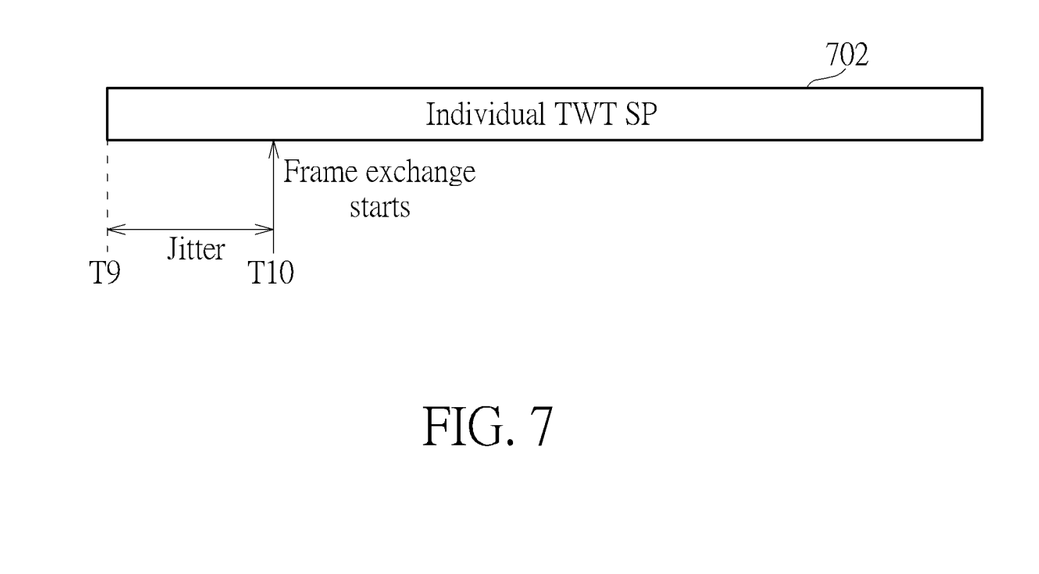
FIG. 7 is a diagram illustrating a sixth AP-side UL latency information collection design according to an embodiment of the present invention.

FIG. 7 is a diagram illustrating a sixth AP-side UL latency information collection design according to an embodiment of the present invention. Target wake times (TWTs) allow STAs to manage activity in the BSS by scheduling STAs to operate at different times in order to minimize contention and to reduce the required amount of time that a STA utilizing a power management mode needs to be awake. For example, each non-AP STA 104_i (1≤i≤N) can negotiate with AP 102 for individual TWT, and can have designated service periods (SPs) during which the non-AP STA can wake up to receive DL traffic from AP 102 or transmit UL traffic to AP 102. Any individual TWT SP designated for non-AP STA 104_i is a definite time period for DL/UL transmission. As shown in FIG. 7, one individual TWT SP 702 agreed between AP 102 and non-AP STA 104_i should start at a time instant T9. However, AP 102 may not be able to initialize the individual TWT SP 702 on time due to interference, TXOP occupancy by other non-AP STAs, and/or AP's schedule. Jitter from the SP start time until the actual frame exchange may serve as an indicator about how AP 102 can serve non-AP STA's individual TWT, and may be regarded as UL latency. In a third exemplary UL latency indicator design, each UL latency indicator IND generated from the data processing circuit 114 is an individual TWT SP latency indicator. Hence, the latency information INF_L collected by the data collecting circuit 112 includes a time delay between the start time T9 of the individual TWT 702 designated for non-AP STA 104_i and a time instant T10 at which AP 102 starts actual frame exchange with non-AP STA 104_i during the individual TWT 702. The data processing circuit 114 performs statistical analysis on the latency information INF_L (which includes jitter information) to generate an UL latency indicator IND. In other words, statistics of the jitter provide latency information of individual TWN agreed between AP and non-AP STAs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An uplink (UL) latency indication method comprising:
collecting, by an access point (AP), latency information associated with communications with at least one non-AP station (STA), without asking latency measurement on said at least one non-AP STA;
performing statistical analysis on the latency information to generate at least one UL latency indicator; and
receiving a buffer status from one of said at least one non-AP STA;
wherein the latency information comprises:
a time delay between a time instant at which the AP receives the buffer status and a time instant at which the AP sends a trigger frame to trigger UL traffic from said one of said at least one non-AP STA in response to the buffer status.

2. The UL latency indication method of claim 1, wherein the at least one UL latency indicator is calculated by the AP.

3. The UL latency indication method of claim 1, wherein performing statistical analysis on the latency information to generate said at least one UL latency indicator comprises:
generating one UL latency indicator per access category (AC).

4. The UL latency indication method of claim 1, wherein performing statistical analysis on the latency information to generate said at least one UL latency indicator comprises:
generating a first UL latency indicator by performing statistical analysis on time delays, each between a time instant at which the AP receives one solicited buffer status and a time instant at which the AP sends one trigger frame to respond to said one solicited buffer status; and generating a second UL latency indicator by performing statistical analysis on time delays, each between a time instant at which the AP receives one unsolicited buffer status and a time instant at which the AP sends one trigger frame to respond to said one unsolicited buffer status.

5. An uplink (UL) latency indication method comprising:
collecting, by an access point (AP), latency information associated with communications with at least one non-AP station (STA), without asking latency measurement on said at least one non-AP STA;
performing statistical analysis on the latency information to generate at least one UL latency indicator; and
receiving traffic indication information from one of said at least one non-AP STA, wherein the traffic indication information contains timing information of UL traffic, and is carried by a control information subfield in an aggregated control (A-Control) subfield;
wherein the latency information comprises:
a time delay between a time instant at which a trigger frame is requested by the traffic indication information and a time instant at which the AP sends the trigger frame to trigger the UL traffic from said one of said at least one non-AP STA.

6. The UL latency indication method of claim 5, wherein the traffic indication information carried by the A-Control subfield is informative only, without being used for doing negotiation with the AP.

7. The UL latency indication method of claim 5, wherein the UL traffic is required by a latency sensitive traffic application.

8. The UL latency indication method of claim 5, wherein the UL traffic is periodic UL traffic.

9. An uplink (UL) latency indication method comprising:
collecting, by an access point (AP), latency information associated with communications with at least one non-AP station (STA), without asking latency measurement on said at least one non-AP STA; and
performing statistical analysis on the latency information to generate at least one UL latency indicator;
wherein the latency information comprises:
a time delay between a start time of an individual target wake time (TWT) service period (SP) designated for one of said at least one non-AP STA and a time instant at which the AP starts actual frame exchange with said one of said at least one non-AP STA during the individual TWT SP.

10. An access point (AP) comprising:
a data collecting circuit, arranged to collect latency information associated with communications with at least one non-AP station (STA), without asking latency measurement on said at least one non-AP STA;
a data processing circuit, arranged to perform statistical analysis on the latency information to generate at least one uplink (UL) latency indicator;
a receiver circuit, arranged to receive a buffer status from one of said at least one non-AP STA; and
a transmitter circuit, arranged to send a trigger frame to trigger UL traffic from said one of said at least one non-AP STA in response to the buffer status;
wherein the latency information comprises:
a time delay between a time instant at which the AP receives the buffer status and a time instant at which the AP sends the trigger frame.

11. The AP of claim 10, wherein the data processing circuit is arranged to generate one UL latency indicator per access category (AC).

12. The AP of claim 10, wherein the data processing circuit is arranged to generate a first UL latency indicator by performing statistical analysis on time delays, each between a time instant at which the AP receives one solicited buffer status and a time instant at which the AP sends one trigger frame to respond to said one solicited buffer status; and is further arranged to generate a second UL latency indicator by performing statistical analysis on time delays, each between a time instant at which the AP receives one unsolicited buffer status and a time instant at which the AP sends one trigger frame to respond to said one unsolicited buffer status.

13. An access point (AP) comprising:
- a data collecting circuit, arranged to collect latency information associated with communications with at least one non-AP station (STA), without asking latency measurement on said at least one non-AP STA;
- a data processing circuit, arranged to perform statistical analysis on the latency information to generate at least one uplink (UL) latency indicator;
- a receiver circuit, arranged to receive traffic indication information from one of said at least one non-AP STA, wherein the traffic indication information contains timing information of UL traffic, and is carried by a control information subfield in an aggregated control (A-Control) subfield; and
- a transmitter circuit, arranged to send a trigger frame to trigger the UL traffic from said one of said at least one non-AP STA;

wherein the latency information comprises:
- a time delay between a time instant at which the trigger frame is requested by the traffic indication information and a time instant at which the AP sends the trigger frame.

14. The AP of claim 13, wherein the traffic indication information carried by the A-Control subfield is informative only, without being used for doing negotiation with the AP.

15. The AP of claim 13, wherein the UL traffic is required by a latency sensitive traffic application.

16. The AP of claim 13, wherein the UL traffic is periodic UL traffic.

17. An access point (AP) comprising:
- a data collecting circuit, arranged to collect latency information associated with communications with at least one non-AP station (STA), without asking latency measurement on said at least one non-AP STA; and
- a data processing circuit, arranged to perform statistical analysis on the latency information to generate at least one uplink (UL) latency indicator;

wherein the latency information comprises:
- a time delay between a start time of an individual target wake time (TWT) service period (SP) designated for one of said at least one non-AP STA and a time instant at which the AP starts actual frame exchange with said one of said at least one non-AP STA during the individual TWT SP.

* * * * *